United States Patent [19]

Lee

[11] Patent Number: 4,715,040
[45] Date of Patent: Dec. 22, 1987

[54] LASER SYSTEM

[75] Inventor: Chun-Shen Lee, Torrance, Calif.

[73] Assignee: Amada Engineering & Service Co., Inc., La Mirada, Calif.

[21] Appl. No.: 722,078

[22] Filed: Apr. 11, 1985

[51] Int. Cl.$^4$ ............................................... H01S 3/08
[52] U.S. Cl. ...................................... 372/98; 372/92; 372/19
[58] Field of Search ..................... 372/20, 101, 19, 92, 372/98

[56] References Cited

PUBLICATIONS

Krupke et al, "Properties of an Unstable Confocal Resonator $CO_2$ Laser System"; IEEE Jour. Quant. Elect., Dec. 1969.
Kortz et al; "Stability and Beam Divergence of Multi-mode Lasers with Internal Variable Lenses"; Appl. Opt., vol. 20, No. 23, 1 Dec. '81.
Smith; "Mode Selection in Lasers"; Proc. IEEE, vol. 60, No. 4, Apr. '72.
Li et al; "Mode Selection and Mode Vol. Enhancement in a Gas Laser with Internal Lens"; Proc. IEEE, vol. 53, p. 399, Apr. '65.

Primary Examiner—Leon Scott, Jr.
Attorney, Agent, or Firm—Wigman & Cohen

[57] ABSTRACT

The present invention relates to a laser system that has an optical resonator, a laser medium included in the optical resonator, a pumping device for exciting the laser medium, and a device for tuning the laser action. The tuning device includes an optically aberrated lens element located in the optical resonator. The profile of the laser beam is determined by the focal length of the central rays and abberation parameter of the abberated lens element.

5 Claims, 11 Drawing Figures

LASER SYSTEM

FIELD OF THE INVENTION

This invention relates to a laser system which make it possible to control of the spatial modes of a laser beam, more particularly to a method and an apparatus for producing a output beam with desired profile from the laser system.

BACKGROUND OF THE INVENTION

A laser system is now widely used in various fields, e.g. material processing, surface study, spatial optical information processing.

However, in a conventional laser system, an active resonator of the laser system oscillates simply in certain eigenmodes associated with a cavity formed by a pair of mirrors, so that the profile of the output beam produced by the conventional laser system is usually like a column; and it is hard to control the profile of the output beam. For example, if the output beam is, before focusing, interrupted by a board with a perforation, which has the same figure as the desirable profile of the beam cross section, then the output beam with desirable cross section is obtained. However, in that case some portion of the output beam is scattered by the board, and some energy of the laser, which was put into the cavity, is dissipated wastedly. It is also difficult to arbitrarily pick up a mode, which has a desirable beam cross section, from multi-modes excited in the resonant cavity, except for the lowest order mode, which has the profile like a column as mentioned above.

Accordingly, the object of the present invention is to provide a laser system, which makes it possible to control the spatial profile of the output beam without wasting any energy.

This and other objects and features of the invention will become apparent by reference to the following detailed description of preferred embodiments when considered in conjunction with the accompanying drawing.

SUMMARY OF THE INVENTION

In accordance with the present invention, control of the spatial profile of the output beam produced by a laser system is achieved by means of letting the laser action take place only at a local region of an optical resonator which is defined by an opposing local portion of mirrors of the optical resonator.

To be more concrete, the laser action which takes place at the local region of an optical resonator is produced, for example, by means of an intracavity optically aberrated element which operates to tune an active optical resonator as a function of lateral position (or zone) in the resonator. For zones in which the active resonator operates in a state of stable cavity configuration, lasing action will take place. However, for zones in which the active resonator operates in a state of unstable cavity configuration, lasing action ceases. By properly designing the aberration of the intracavity aberrated element, a desirable beam profile can be obtained from a laser system.

BRIEF DESCRIPTION OF THE DRAWINGS

FIG. 4(a) also shows an example of distributed focal length f(r) as a function of radius r lateral position on the aberrated lens element included in the embodiment in FIG. 1.

DETAILED DESCRIPTION OF EMBODIMENTS

Figure 1:
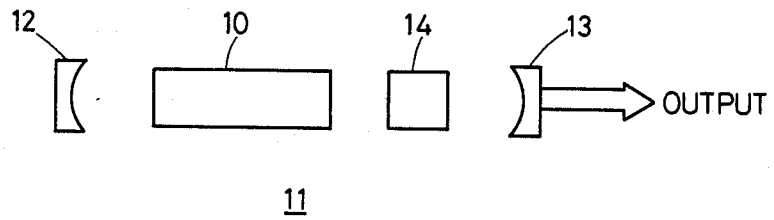
FIG. 1 is a schematic illustration of one embodiment of the present invention.

Referring to the drawings, FIG. 1 shows a first embodiment of the invention, comprising an active gain medium 10 which includes excitation sources; a cavity 11, defined by reflectors 12 and 13; and an optically aberrated lens element 14 disposed within the cavity.

The active gain medium 10 which can be in a form of either solid, liquid or gas phase, is utilized to sustain regenerative process for laser action in the cavity 11. It is assumed that the active gain medium 10 is optically homogenous throughout its entire volume. Mirrors 12 and 16 form the optical cavity 11 which provides feedback for laser action to take place in the active medium 10. The surface toward the resonator cavity 11 of the mirror 12 has a high reflectivity (HR) coating, whereas that of mirror 13 has a partially transmissive coating. The radii of curvature of mirrors 12 and 13 are properly selected depending on the operation condition of the device.

The optically aberrated element 14, is an uncorrected spherical lens, for instance. The uncorrected spherical lens 14 is characterized by its focusing characteristics, in which the focal length differs for optical beams passing through different lateral zones of the uncorrected spherical lens. For example, for a ray passing through the uncorrected spherical lens at a zone of radius r, the focal length f(r), in which the 3rd-order aberration is included, can be expressed in the form $$f(r) = f_0 + k(r/a)^2 \qquad (1)$$

where $f_0$ is the focal length of the central rays; k is the aberration parameter and a is the radius of the lens.

If the optically aberrated element 14 is absent, then the active resonator 11 will essentially oscillate in certain eigenmodes associated with the cavity formed by mirrors 12 and 13. As a result the laser system will, for example, produce an output beam with circular profile of beam cross section.

However, the presence of an optically aberrated element 14 within the cavity destroys this ability to oscillate in an eigenmode defined by cavity mirrors 12 and 13. The present invention is based upon the recognition of this phenomena.

The basic principles of the invention will be first explained and then will be applied to the laser system shown in FIG. 1.

Figure 2:
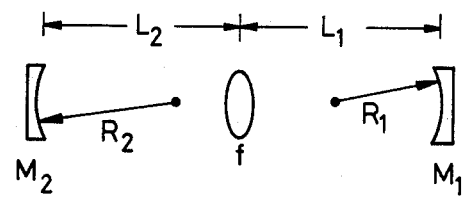
FIG. 2 is another schematic illustration of one embodiment of the present invention, which shows the parameters appearing in the explanation.

Generally, an active resonator containing an intracavity thin-lens element can be described by the cavity g- parameters given by $$g_1 = 1 - L_2/f - L_0/R_1 \quad g_2 = 1 - L_1/f - L_0/R_2 \qquad (2)$$

where $L_0 = L_1 + L_2 - (L_1 L_2/f)$ and f is the focal length of the internal lens. $L_1$ and $L_2$ are the spacings between mirrors $M_1$, $M_2$ and the lens; $R_1$ and $R_2$ are the radii of curvature of mirrors $M_1$ and $M_2$, as shown in FIG. 2.

Figure 3:
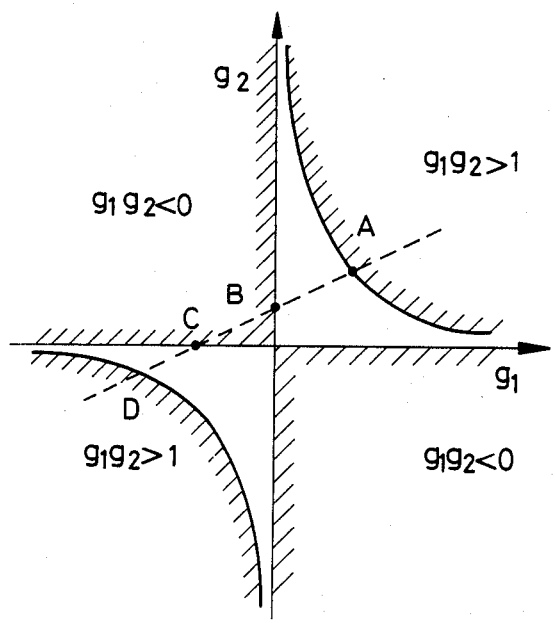
FIG. 3 shows the stable and the unstable region of the optical resonator in terms of cavity g- parameters $g_1$ and $g_2$.

The stability criterion of the active resonator, given by the inequality $0 < g_1 g_2 < 1$, can be expressed graphically by FIG. 3. All cavity configurations are unstable unless they correspond to points lying in the area enclosed by a branch of the hyperbola (i.e., $g_1 g_2 = 1$) and the coordinate axes (unshaded area).

If the internal lens is aberration free, then the focal length f is a constant and the whole lateral region of the active resonator will be in either a stable state (unshaded area) or an unstable state (shaded area).

On the other hand, if there is an aberration in the internal lens element, such as Eq.(1), the active resonator may behave quite differently. In this case, the focal length is not a constant, but depends on the lateral position r of the aberrated lens element. Thus, cavity g-parameters $g_1$ and $g_2$ given by Eq.(2), also depend on r; $g_1(r)$ and $g_2(r)$ are hereafter called local cavity g- parameters. Since, both $g_1(r)$ and $g_2(r)$ are linear functions of $1/f(r)$, when $1/f(r)$ is eliminated from Eq.(2), $g_2(r)$ can be expressed as a linear function of $g_2(r)$. The dashed line in FIG. 3 shows such linear relation between $g_1(r)$ and $g_2(r)$ for an asymmetric resonator. It can be considered that a point on the dashed line, which indicates a local cavity g-parameter, moves as the lateral position r changes. For example, as r increases from zero (i.e. onoptical axis) to which is a radius of the aberrated lens element, that point moves as D→C→B→A. Since the cavity is stable only between D and C, or between B and A, laser action can take place in such a local lateral region that local cavity g-parameters $g_1(r)$ and $g_2(r)$ have a value between D and C, or between B and A; on the other hand, laser action can not take place in such a local lateral region that $g_1(r)$ and $g_2(r)$ have a value between C and B.

Consequently, if there is an aberration in the internal lens element, laser action takes place only at the local lateral region of the cavity in which the local cavity g-parameters fall in stable region in FIG. 3.

Next, the basic principle explained above is applied to the laser system shown in FIG. 1, wherein the focal length f(r) of the aberrated lens element 14 is given by Eq.(1).

As explained, since both $g_1(r)$ and $g_2(r)$ are linear functions of $1/f(r)$, the stable and the unstable region in FIG. 3 are simply expressed in terms of focal length f(r). In fact, laser action takes place when the focal length of the internal lens falls within those indicated by points either between A and B, or between C and D (i.e., in the stable cavity region) as shown in FIG. 3. The focal lengths corresponding to points A, B, C, and D are indicated by $f_A$, $f_B$, $f_C$, and $f_D$, respectively.

FIGS. 4(a), 5(a), 6(a) and 7(a) show the stable and unstable region of focal length f, which is determined from Eq. (1) and the diagram in FIG. 3; FIG. 4(a)–7(a) also show the four kinds of distributed focal length f(r) against radius r at the lateral position r, where r is normalized by the radius a of the aberrated lens element.

Figures 4A, 4B:
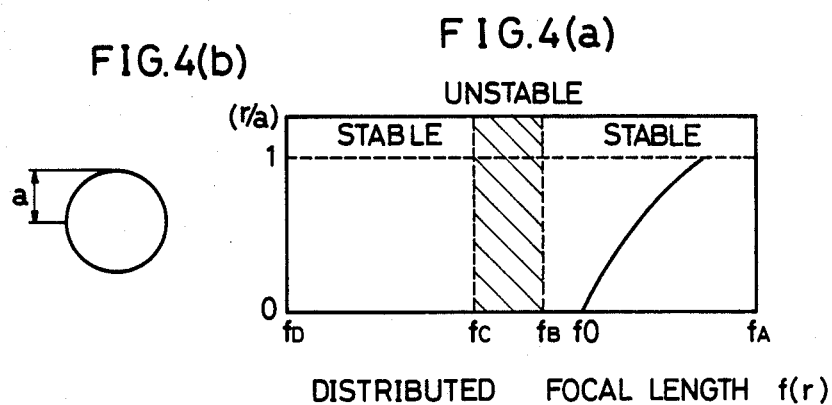
FIG. 4(a) shows the stable and unstable region of the optical resonator in terms of focal length f.
FIG. 4(b) show the profile of the beam cross section produced by a laser system which includes the aberrated lens element having a distributed focal length f(r) given by FIG. 4(a).

In the case of the distributed focal length f(r) shown in FIG. 4(a), focal length f(r) always falls in the stable region of the optical resonator, i.e., $f_B < f(r) < f_A$ for $0 < r/a < 1$. Therefore, if the active laser medium is excited by the pumping means, the laser action takes place in every lateral position in the cavity 11 to produce an output beam with the circular profile of the beam cross section as is shown in FIG. 4(b).

Figures 5A, 5B:
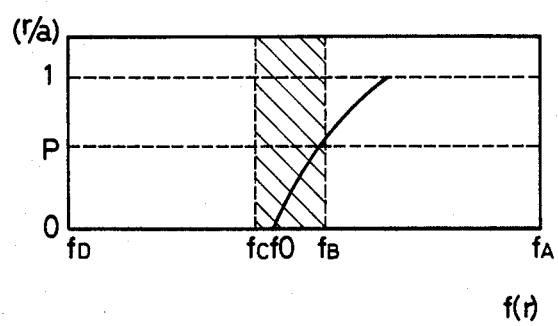
FIGS. 5(a), 6(a) and 7(a) show another examples of distributed focal length f(r) in which focal lengths $f_o$ at the optical axis of the aberrated lens element are smaller than that of distributed focal length f(r) given by FIG. 4(a).
FIGS. 5(b), 6(b) and 7(b) show the profile of the beam cross section produced by a laser system which includes the aberrated lens element having a distributed focal length f(r) given by FIGS. 5(a), 6(a), and 7(a) respectively.

However, in the case of the distributed focal length f(r) shown in FIG. 5(a), f(r) falls in the stable region only for $P < (r/a) < 1$, so that, if the active laser medium is excited, the laser action takes place only in the region defined by $P < r/a < 1$. In other words, a ray passing through the region $P < r/a < 1$ of the aberrated lens element 14 is amplified to produce an output beam, but a ray passing through the region $1 < r/a < P$ of the aberrated lens element 14 is damped to produce no output beam. Therefore, in this case, the laser system produces the output beam with the cylindrical profile shown in FIG. 5(b), which is clearly observed in the embodiment of the present invention by the present inventor.

Figure 6B:
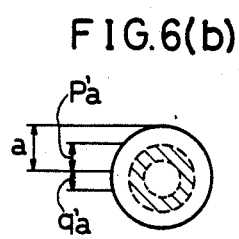
Figure 6A:
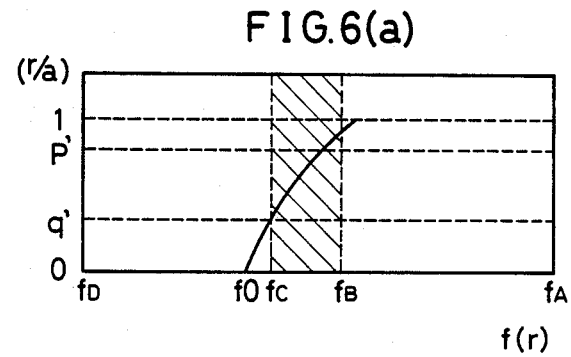
Figure 7B:
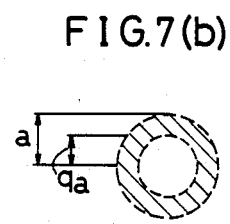
Figure 7A:
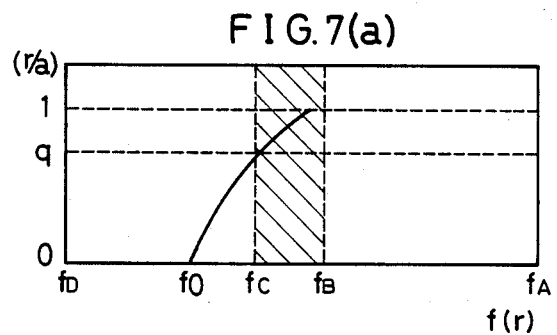

In the case of the distributed focal length f(r) which is shown in FIG. 6(b) and FIG. 7(b), the same situation occurs as in the case in FIG. 7(a), and the laser system produces another type of the output beam with cross sections shown in FIG. 6(b) and 7(b).

To summarize, in an active resonator with an intracavity aberrated lens element, different lateral zones on the resonator may operate in different states of cavity configuration (i.e., either in stable or unstable states) as a result of lens aberration. Zones that participate in lesser action (i.e., in a stable resonator state) are those shadowed as shown in FIGS. 4(b)–7(b).

Therefore, by proper selection of $f_0$ and k in Eq. (1), a desirable laser beam profile can be obtained.

As is evident from the above, the laser system of the present invention, shown in FIG. 1, can produce the output beam with the various types of profiles in cross-section, which can be conveniently used as means for surface hardening the part of a surface with a figure like a ring as, shown in FIGS. 5(b) and 6(b).

The embodiment of the invention is also applicable to the case when the active gain medium 10 as well as the cavity mirrors 12 and 13 have a rectangular cross sectional area, which is a common practice for a transversely discharged laser, e.g., a TEA (Transversely Excited Atomspheric) $CO_2$ laser or an excimer laser.

What is claimed is:

1. The method of outputting a laser beam with predetermined beam profile, comprising the steps of:
    providing a pair of mirrors defining an optical cavity;
    disposing a laser medium in the optical cavity; and
    inserting an optically aberrated element into the optical cavity so that an optical resonator containing the aberrated element exhibits high power loss in a local region of a beam cross section where the magnitude of beam intensity is substantially zero, and shows low power loss in the remaining region of the beam cross section where the magnitude of the beam intensity is finite.

2. A laser system comprising: an optical resonator exhibiting high power loss in a local region of a beam cross section and exhibiting low power loss in the remaining region due to an optically aberrated element provided therein, said resonator further comprising:

a pair of mirrors opposing one another having a spacing L defining an optical cavity;

the radii of curvature of said mirrors being $R_1$ and $R_2$ respectively;

a laser medium;

a pumping means for exciting said medium;

an optically aberrated element disposed between said pair of mirrors with spacings $L_1$ and $L_2 = L - L_1$ between said mirrors and said abberated element;

said optically aberrated element having a focal length f(r) depending on a lateral coordinate r in the cross section of the resonator, satisfying the relation $0 < g_1(r) \cdot g_2(r) < 1$ in a region of low power loss and satisfying any one of relations $g_1(r) \cdot g_2(r) < 0$ and $g_1(r) \cdot g_2(r) > 1$ in a region of high power loss;

wherein $g_1(r)$ is a local cavity g-parameter such that $g/1(r) = (1 - L_1/f(r) - L_0/R_1)$, $g_2(r)$ is another local cavity g-parameter such that $g/2(r) = (1 - L_2/f(r) - L_0/R_2)$ and $L_0$ is an effective spacing between said pair of mirrors such that $L/0 = L_1 + L_2 - L_1 L_2 / f(r)$.

3. The laser system of claim 2, wherein said optically aberrated element is an uncorrected spherical lens whose focal length f(r) has a form $f(r) = f_0 + k(r/a)^2$ where $f_0$ is the focal length of the central ray, k is the aberration parameter and a is the radius of the lens.

4. The laser system of claim 3, wherein $L_1$ is different from $L_2$.

5. A method of outputting a laser beam with predetermined beam profile as claimed in claim 1, wherein the optically aberrated element is inserted into the optical cavity so that the relation $0 < g_1(r) \cdot g_2(r) < 1$ is satisfied for lateral coordinates r involved in a region of the beam cross section where the amplitude of laser intensity should be finite, and any one of relations $g_1(r) \cdot g_2(r) < 0$ and $g_1(r) \cdot g_2(r) > 1$ are satisfied for lateral coordintes r involved in a region of the beam cross section where the amplitude of laser intensity should be substantially zero, wherein $g_1(r)$ is a local cavity g-parameter such that $g/1(r) = (1 - L_1/f(r) - L_0/R_1)$, $g_2(r)$ is another local cavity g-parameter such that $g/2(r) = (1 - L_2/f(r) - L_0/R_2)$, $L_1$ and $L_2$ are spacings between the mirrors and the optically aberrated element, f(r) is the focal length of said element depending on the lateral coordiate r, $R_1$ and $R_2$ are radii of curvature of the mirrors, and $L_0$ is an effective spacing between said pair of mirrors such that $L/0 = L_1 + L_2 - L_1 L_2 / f(r)$.

* * * * *